United States Patent
Buonassissi

[15] 3,640,544
[45] Feb. 8, 1972

[54] HANDCART

[72] Inventor: Albert J. Buonassissi, 742 Lakewood Drive, Sunnyvale, Calif. 94086

[22] Filed: June 8, 1970

[21] Appl. No.: 44,279

[52] U.S. Cl. .....................................280/47.35, 280/36 R
[51] Int. Cl. .......................................................B62b 11/00
[58] Field of Search ............280/47.26, 47.24, 47.34, 47.35, 280/47.36, 47.37, 36 R, 62, 38, 39, 41; 248/419, 188.1, 165; 287/54 C

[56] References Cited

UNITED STATES PATENTS

| | | | |
|---|---|---|---|
| 2,582,435 | 1/1952 | Howard | 280/36 |
| 2,890,060 | 6/1959 | Ott et al. | 280/47.37 |
| 1,192,216 | 7/1916 | Louden | 287/54 C |
| 1,380,468 | 6/1921 | Drew | 287/54 C |

Primary Examiner—Benjamin Hersh
Assistant Examiner—Robert R. Song
Attorney—Thomas E. Schatzel

[57] ABSTRACT

Extension apparatus for a handcart adapted to support baggage containers, e.g., postal bags, the apparatus being adapted to be engaged to a standard cart and support containers at an elevated level relative to that of the standard cart.

4 Claims, 3 Drawing Figures

PATENTED FEB 8 1972 3,640,544

INVENTOR.
ALBERT J. BUONASSISSI
BY Thomas C. Schatzel
ATTORNEY

HANDCART

BACKGROUND OF THE INVENTION

The present invention relates to baggage carts and more particularly to hand baggage carts such as those commonly used by mail carriers in delivering mail to residential and office areas.

Mobile carts are commonly used by mail carriers to facilitate the delivery of letters, magazines, newspapers and other small size pieces of mail. These carts, such as that illustrated in U.S. Pat. No. 2,854,243 are utilized to carry and transport quantities of small size mail within residential and office areas thereby alleviating the mail carrier of the burden of physically carrying heavy loads. Delivery procedures commonly include transporting large quantities of mail and a handcart in an automobile from a central postal station to the general area of distribution. The carrier then mounts a number of individual containers filled with mail on the cart. The carrier then pushes the cart door-to-door making deliveries of the individual pieces of mail.

Mobile carts heretofore available support mailbags on opposite sides of a straddle bar with the bags supported by the straddle bar. In the most part the bags are supported such that it necessitates considerable physical bending by the carrier himself to enable retrieval of desired pieces of mail. This results in exhaustion of time, physical exhaustion to the carrier and exposure to injury to carriers prone to or suffering from back and other injuries.

SUMMARY OF THE PRESENT INVENTION

The present invention teaches a support rack adapted to be used in combination with mail baggage carts to support the bags in an elevated position such that the interior of the bag is readily visible to the carrier from a normal position. The support rack supports the bags to facilitate and ease retrieving mail from within the bags.

An exemplary embodiment includes a first clamp means adapted for securement to a substantially horizontal straddle bar on the cart; a pair of vertical support columns supported by the first clamp means in a position above the first straddle bar; and a second straddle bar joined to said columns and supported in a position substantially parallel with the straddle bar of the cart. Hook means may be joined to the second straddle bar to engage mailbags. The extension apparatus includes release means for releasing the support rack from the first straddle bar to facilitate portability of the cart when not in use.

DESCRIPTION OF THE PREFERRED EMBODIMENTS

Figure 1:
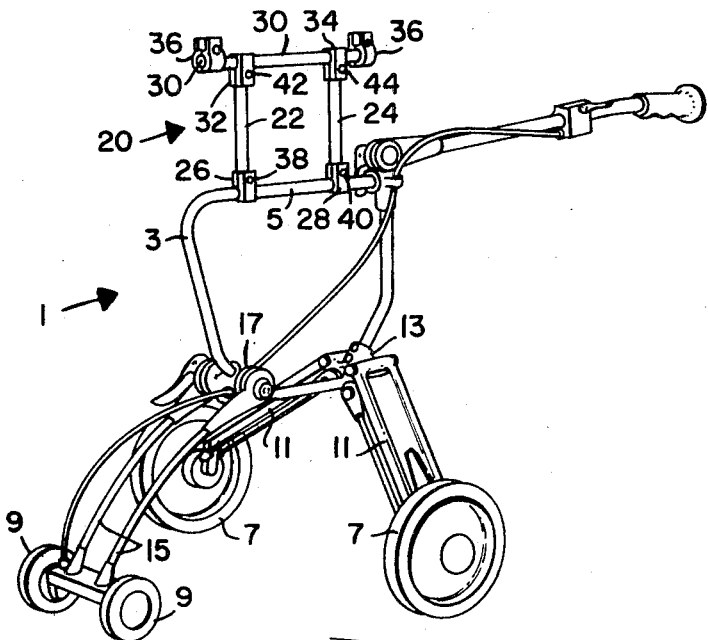
FIG. 1 is a perspective view of a mail cart in combination with the support rack of the present invention.
Figure 2:
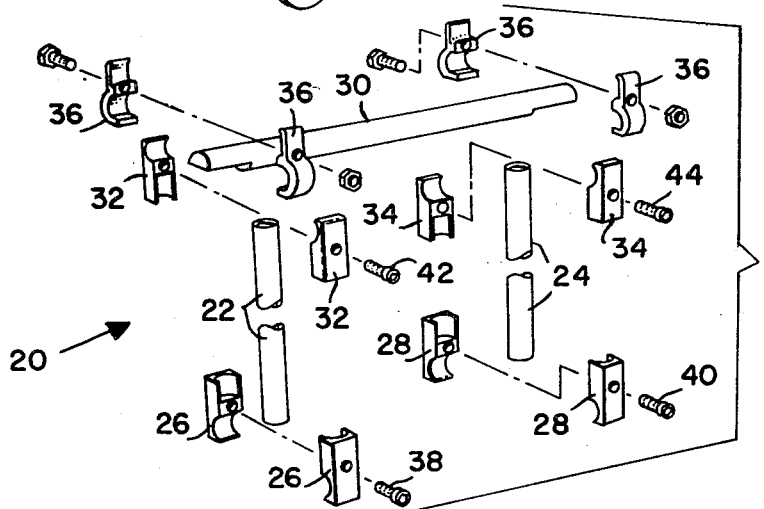
FIG. 2 is an exploded view of the support rack of FIG. 1.

FIG. 1 illustrates a mail cart, referred to by the general reference character 1. The cart is of the general type commonly used by postal carriers for delivering mail in residential and office areas. The cart includes a framing 3 having an integral straddle bar 5 substantially horizontal relative to a reference plane over which the cart travels. A set of two rear wheels 7 and two front wheels 9 are supported by the framing 3. The back wheels 7 are joined to a flexible guide assembly 11 secured to the framing 3 at a pivot joint 13. The front wheels 9 are secured to a tongue assembly 15 secured to the framing 3 at a pivot joint 17. The cart 1 supports an extension rack, referred to by the general reference character 20 adapted to be secured to the integral straddle bar 5. The rack 20 includes support means in the form of a pair of vertical cylindrical columns 22 and 24 secured to the bar 5 by release-clamp means in the form of a pair of pressure release clamps 26 and 28. The clamps 26 and 28 include a pair of concave members adapted to simultaneously engage a column and the bar 5. The columns 22 and 24 are secured at the opposite end to a cylindrical straddle bar 30. The straddle bar 30 is joined to the columns 22 and 24 by means of a pair of release clamps 32 and 34 similar to the clamps 26 and 28. The bar 30 extends longitudinally beyond the clamps 32 and 34 and supports a bag-support hook 36 about each terminal end.

With present postal carrier procedures, it is common for the carrier to transport the cart and mail in an automobile to the general area where the mail is to be distributed. Accordingly, it is desirable for the cart to be folded to a compact package for transport within the interior of an automobile. It is, thus, desirable for the rack 20 to be releasable to accommodate a compact package. The release clamps 26 and 28 are adapted for rapid and convenient installation and removal of the rack 20 to and from the cart 1. The clamps 26 and 28 each consist of a pair of segments urged about the bar 5 and the columns 22 and 24, respectively, by securement means in the form of threaded "Allen" pins 38,40,42 and 44 respectively. The pins 38,40,42 and 44 may be "loosened and tightened" by an "Allen" wrench. Thus, when the cart 1 is not in use, the extension rack 20 may be removed. When the cart 1 is to be put in use, the clamps 26,28 are secured about the bar 5 with the rack 20 supported in position. It has been found that the rack 20 can be placed and secured in position in approximately 10 seconds under normal operations. Upon installation, the rack 20 is further designed such that mailbags hanging on the bar 5 and along the side are not exposed to any parts protruding from the rack 20 which may otherwise cause excessive wear and damage to the bags. For example, the pins 38,40,42 and 44 are all countersunk (recessed) to avoid projections.

The length of the columns 22 and 24 is selected to support the mailbags at a height for convenience and ease of the carrier to avoid the necessity of substantial physical bending by the carrier to examine and select mail from the container. This saves time to the carrier in selecting the proper mail from the bag, provides convenience in the selection and provides an aid to carriers who have suffered from or are prone to injuries due to excessive bending. It further supports the bags at a relatively elevated level thereby avoiding wear of the bags frictionally rubbing against the joint 13 and other parts of the framing of the cart 1. At the same time, while providing this improved feature and convenience, the normal operation of the cart 1 is not altered when the extension 20 is installed and in use.

Figure 3:
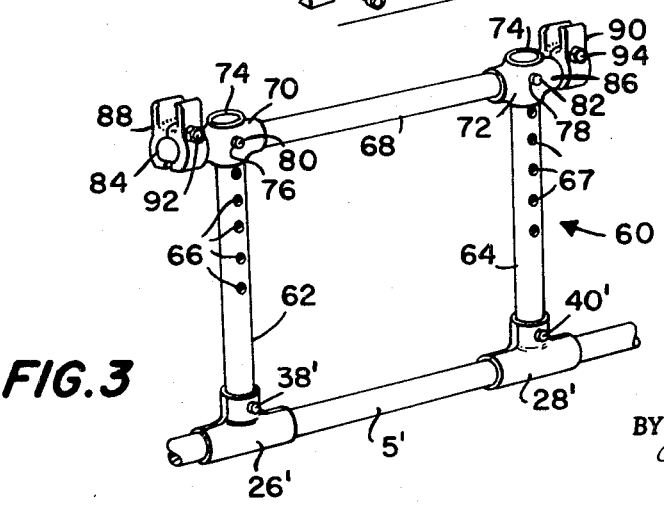
FIG. 3 is a perspective view of an alternative support rack of the present invention.

FIG. 3 illustrates an alternative embodiment in the form of a rack 60 adapted such that the height may be adjusted to a desired elevation. Those elements similar to those of the embodiment 20 carry the same reference numeral with a prime designation. There are included clamps 26' and 28' with pins 38' and 40'. The clamps 26' and 28' support a pair of cylindrical columns 62 and 64 having a plurality of spaced apertures 66 and 67 respectively. A straddle bar 68 is provided to be secured substantially horizontal to the bar 5' by means of a pair of clamps 70 and 72. The clamps 70 and 72 each carry an aperture 74 to permit the clamps to be slid over and circumvent the respective columns 62 and 64. The clamps 70 and 72 each carry an aperture 76 and 78, respectively, to receive a pin 80 and 82. The clamps 70 and 72 may then be secured to the columns 62 and 64, respectively, at the desired heights by insertion of the pins 80,82 within the apertures 76,78 and select apertures 66,67. Each of the clamps 70 and 72 may further carry an extension arm 84 and 86, respectively, with a bag clamp 88 and 90 engaged about the terminal end thereof. The clamps 88 and 90 are secured to the arms by means of securement bolts 92 and 94. Accordingly, mailbags may be positioned along the sides astraddle the bar 68 and about the ends joined to the hooks 88 and 90.

What is claimed is:

1. A baggage cart having a framing with an integral straddle bar positioned above the wheels of said cart, in combination with an extension support rack including:

a second straddle bar;

support means for supporting said second straddle bar above said framing, the support means including a pair of support columns each joined near one terminal end to said integral straddle bar and engaged near the other terminal end to said second straddle bar, said columns supporting said second straddle bar in position substantially parallel to said integral straddle bar;

clamp means for clamping said support means to said framing, the clamp means including a first pair of pressure clamps each adapted for simultaneous engagement to one of said columns and said integral straddle bar, said first pair of pressure clamps being releaseable from said integral straddle bar, and a second pair of pressure clamps each adapted for simultaneous engagement to one of said columns and said second straddle bar and locking said columns and said second straddle bar in place, said second pair of pressure clamps being releasable to permit movement of said second straddle bar relative to said columns; and hook means joined to said second straddle bar for engaging baggage containers and supporting said containers from an elevated position relative to said framing.

2. The cart of claim 1 further including means for adjusting the position of said second clamp means along said columns, and means for locking said second pressure clamp means with said columns at select positions.

3. The cart of claim 2, in which the hook means includes hooks for supporting bag containers on both sides of said second straddle bar and about at least one terminal end of said second bar.

4. The cart of claim 3 in which the hook means includes hooks about both terminal ends of said second bar.

* * * * *